ELECTRICAL PANELBOARD

Original Filed Dec. 20, 1966 5 Sheets-Sheet 1

INVENTORS.
GEORGE N. JORGENSEN
HARRIS I. STANBACK
ROBERT W. DUNHAM

BY Paul J. Rose

ATTY.

Dec. 9, 1969 G. N. JORGENSEN ET AL Re. 26,737

ELECTRICAL PANELBOARD

Original Filed Dec. 20, 1966 5 Sheets-Sheet 2

INVENTORS.
GEORGE N. JORGENSEN
HARRIS I. STANBACK
ROBERT W. DUNHAM

BY Paul J. Rose

ATTY.

ELECTRICAL PANELBOARD
Original Filed Dec. 20, 1966 5 Sheets-Sheet 3
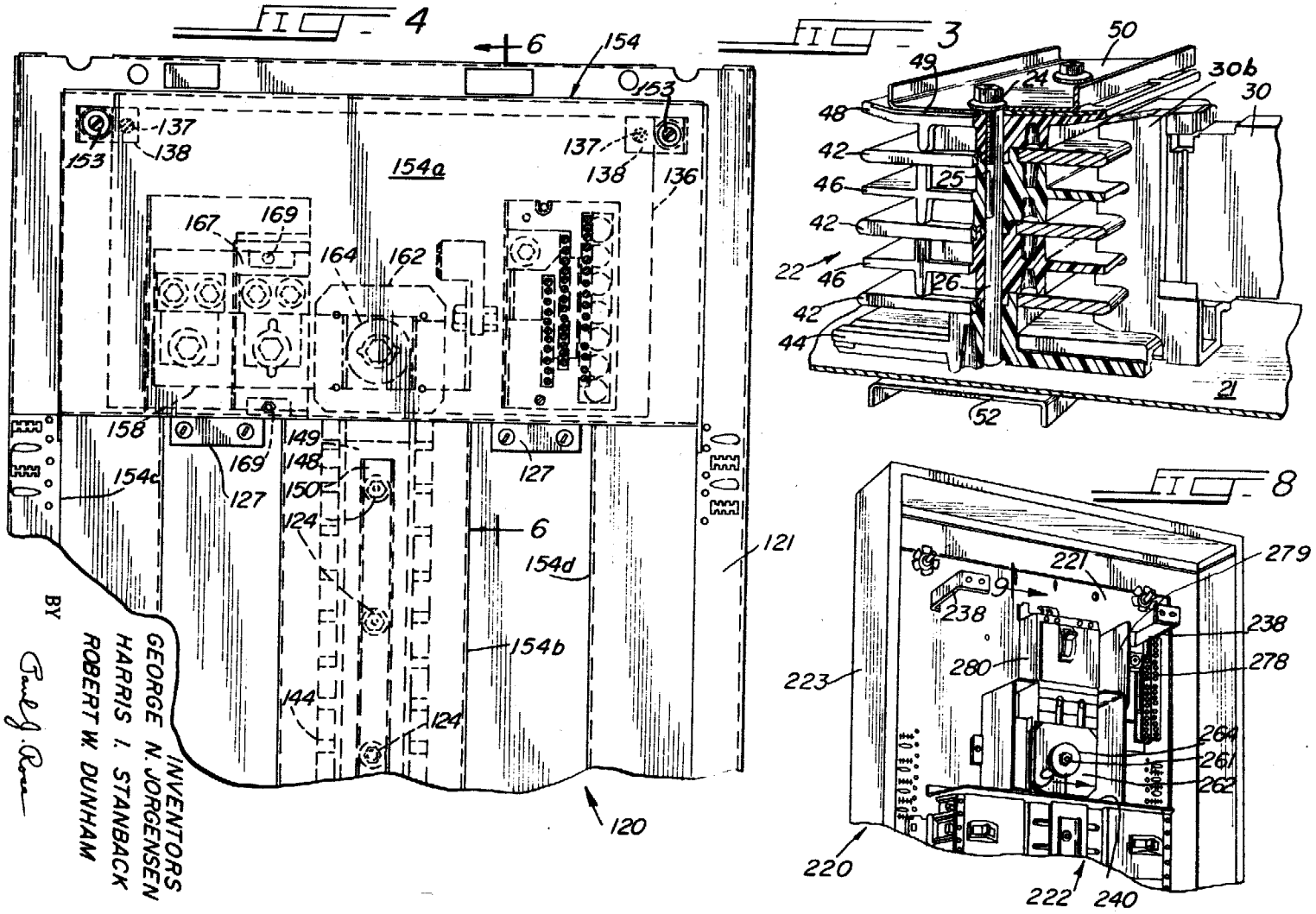

ELECTRICAL PANELBOARD

Original Filed Dec. 20, 1966 5 Sheets-Sheet 4

INVENTORS.
GEORGE N. JORGENSEN
HARRIS I. STANBACK
ROBERT W. DUNHAM

BY Paul J. Rose

INVENTORS.
GEORGE N. JORGENSEN
HARRIS I. STANBACK
ROBERT W. DUNHAM
BY
Paul J. Rose United States Patent Office Re. 26,737
Reissued Dec. 9, 1969

26,737

ELECTRICAL PANELBOARD

George N. Jorgensen and Harris I. Stanback, Lexington, Ky., and Robert W. Dunham, Cedar Rapids, Iowa, assignors to Square D Company, Park Ridge, Ill., a corporation of Michigan Original No. 3,354,357, dated Nov. 21, 1967, Ser. No. 603,367, Dec. 20, 1966. Application for reissue Dec. 18, 1968, Ser. No. 785,822

Int. Cl. H02b *1/02;* H02g *3/00*

U.S. Cl. 317—119 18 Claims

Matter enclosed in heavy brackets [ ] appears in the original patent but forms no part of this reissue specification; matter printed in italics indicates the additions made by reissue.

ABSTRACT OF THE DISCLOSURE

An electrical panelboard having a box and three flat bus bars stacked with their flat sides parallel to a rear wall of the box. Electric circuit breakers of various sizes may be plugged on opposite edge portions of the bus bars in various arrangements.

Summary of the invention

An object of the invention is to provide an improved electrical panelboard in which circuit breakers of various ratings and various physical sizes may be readily mounted in various arrangements.

Another object is to provide an improved electrical panelboard which does not require the addition of branch bus bars or connectors when an additional branch circuit breaker is added in the field to a previously installed panelboard.

A further object is to provide an improved electrical panelboard to which additional branch circuit breakers may be added in the field without interruption of power to the panelboard and with adequate safety if reasonable care is used.

Still another object is to provide an electrical panelboard in which the short circuit interrupting rating of each of a plurality of circuit breakers mounted in the panelboard is just as high as the maximum short circuit interrupting rating the circuit breaker has when mounted by itself in a separate enclosure.

A still further object is to provide an electrical panelboard in which each of a plurality of circuit breakers mounted in the panelboard can interrupt a current equal to its maximum short circuit interrupting rating without causing a flashover or other fault.

Another object is to provide an electrical panelboard having an improved arrangement of bus bars and insulators therefor, resulting in less heat generation, better conduction of heat away from the plug-in jaws of circuit breakers on the panelboard, better bracing of the bus bars, a shallower box, and less bus bar material than in former panelboard constructions of similar ratings.

A further object is to provide an improved connector arrangement by which connectors for receiving electrical power cables are electrically connected respectively to bus bars of the panelboard.

Still another object is to provide an electrical panelboard having improved safety means for preventing contact between a metallic interior trim panel and bus bars of the panelboard and also between the interior trim panel and input power line connectors of the panelboard when mounting the interior trim panel on the panelboard while the panelboard is energized.

Brief description of the drawings

FIG. 3 is a fragmentary perspective view, certain parts being sectioned as generally indicated by the line 3—3 of FIG. 2 and a portion of a single-pole circuit breaker being included;

FIG. 4 is a fragmentary front view of an electrical panelboard substantially identical to that of FIG. 1 but having narrower bus bars, a mounting pan assembly and an interior trim panel being included, and a box and exterior trim panel of the panelboard being omitted;

FIG. 8 is a fragmentary perspective view of an electrical panelboard constructed in accordance with the invention and having a main circuit breaker through which electrical power is fed to bus bars of the panelboard, an interior trim panel and an exterior trim panel being omitted.

Description of the preferred embodiments

Figure 1:
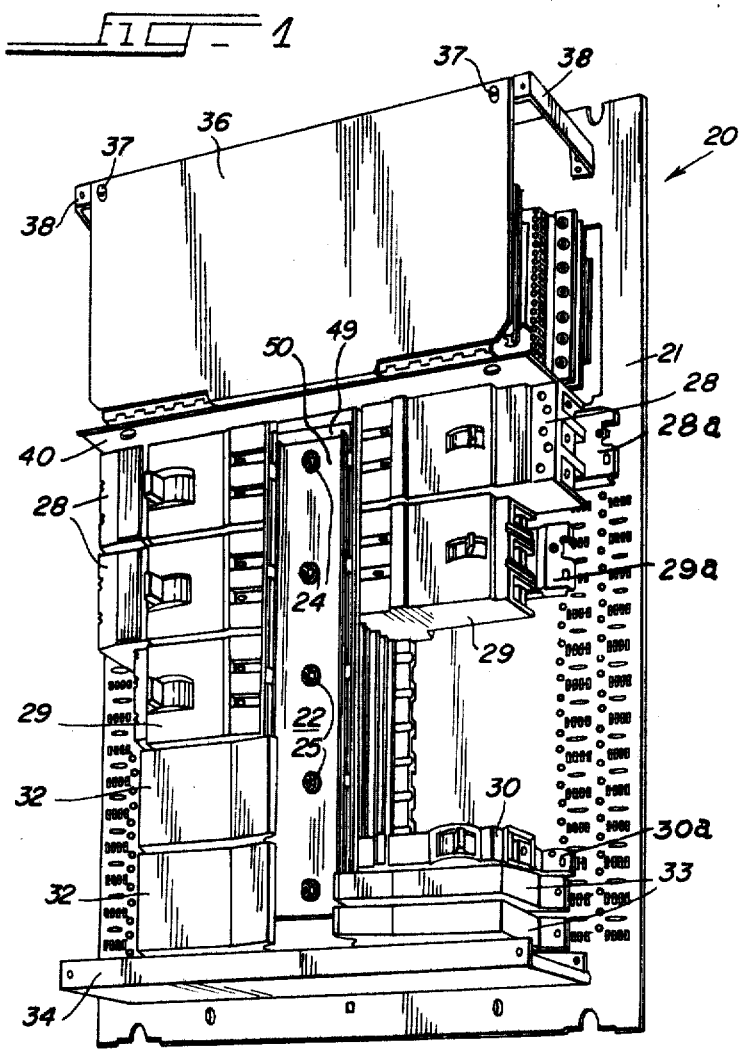
FIG. 1 is a perspective view of an electrical panelboard constructed in accordance with the invention, a mounting pan assembly being shown and a box, an interior trim panel, and an exterior trim panel of the panelboard being omitted.

FIG. 1 shows an electrical panelboard 20 constructed in accordance with the invention, a box and certain trim panels being omitted. The panelboard 20 includes a mounting pan 21 having a stack 22 of elongated flat bus bars, insulators, and clamping members secured thereto by a plurality of nuts 24 threaded respectively on a plurality of bolts 25 extending through the stack 22 from the rear of the mounting pan 21.

For purposes of illustration, three relatively large three-pole circuit breakers 28, two relatively small three-pole circuit breakers 29, and one relatively small single-pole circuit breaker 30 are shown mounted on the mounting pan 21, along with two fillers 32 having a width of three pole spacers and two fillers 33 having a width of one pole space.

An end barrier 34 is secured to the mounting pan 21 adjacent the lower end thereof as viewed in FIG. 1. A safety panel 36 is disposed in spaced relationship to the upper end portion of the mounting pan 21 as viewed in FIG. 1. The panel 36 is hinged at its lower end as shown and is normally secured adjacent its upper end by a pair of screws 37 to a pair of spaced brackets 38 secured to the mounting pan 21. The bus bars of the stack 22 extend through suitable openings in an insulating sheet 40 and into the space between the panel 36 and the mounting pan 21, as in the manner shown in FIG. 6 for the embodiment of the invention illustrated in FIGS. 4, 5, 6, and 7.

Figure 2:
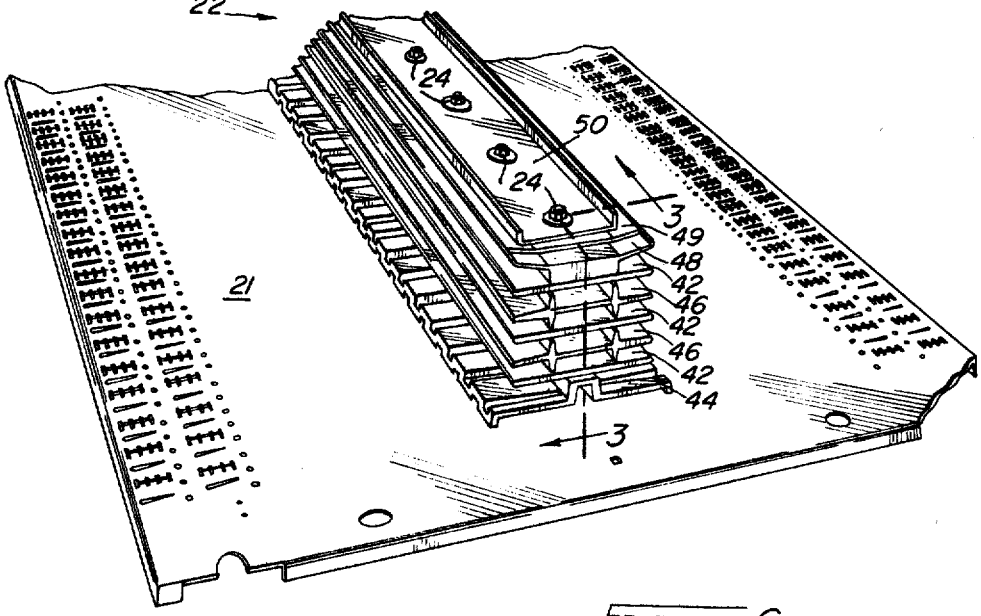
FIG. 2 is a fragmentary perspective view of the lower portion of the mounting pan assembly of FIG. 1, certain parts being removed.

The stack 22 of bus bars, insulators, and clamping members is more clearly shown in FIG. 2 and includes three elongated flat bus bars 42, a rear insulator 44, two intermediate insultors 46, a front insulator 48, a front insulating sheet 49, and a front clamping member 50.

As shown in FIG. 3, a rear clamping member 52 is provided on the rear side of the mounting pan 21, and each bolt 25 is provided with an insulating sleeve 26. The holes provided in each of the three bus bars 42 for the reception of the bolts 25 and sleeves 26 are larger than the sleeves 26 and receive internesting portions of respective pairs of the insulators 44, 46, and 48, as shown in FIG. 3.

Figure 9:
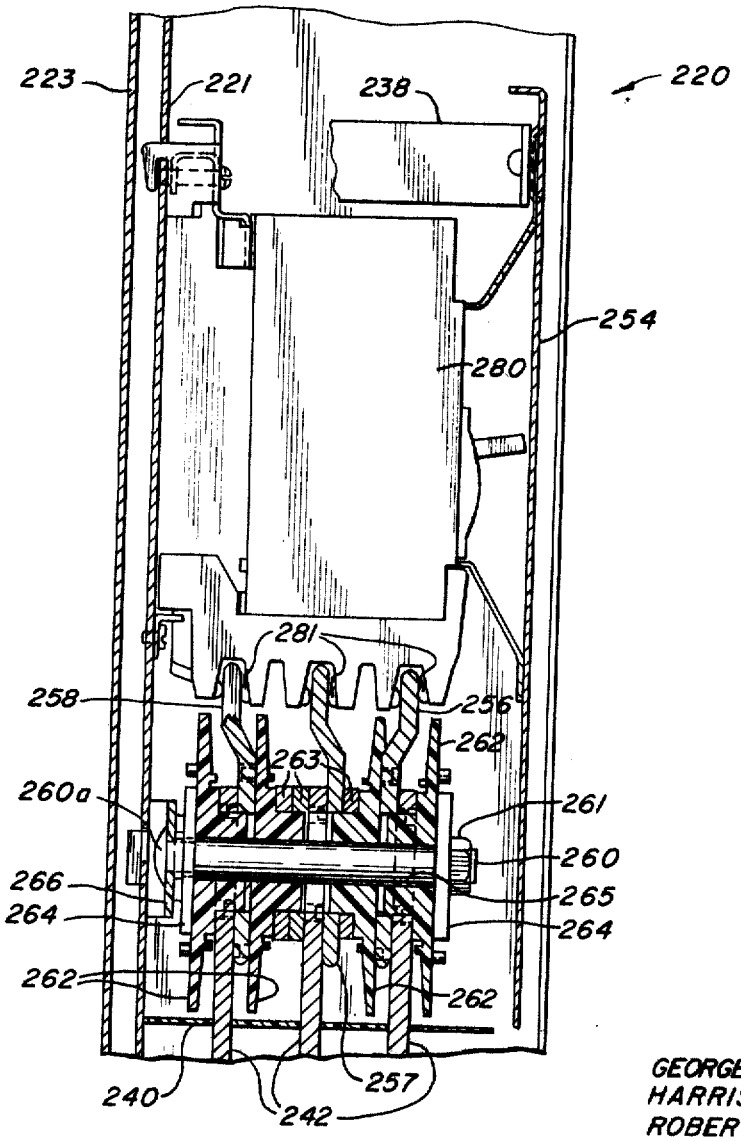
FIG. 9 is a fragmentary sectional view taken generally along the line 9—9 of FIG. 8 and including an interior trim panel.

Each of the three-pole circuit breakers 28 and 29 is provided with three sets of plug-on jaws which are not shown but which are like three sets of jaws 281 of a main circuit breaker 280 of FIG. 9. The plug-on jaws of the circuit breakers 28 and 29 plug respectively on edge portions of the bus bars 42. The single-pole circuit breaker 30 is provided with only one set of plug-on jaws which plug on the edge portion of one of the bus bars 42. The circuit breakers 28, 29, and 30 are plugged onto the bus bars 42 by moving them in a direction parallel to the mounting pan 21 and are held in mounted position by suitable brackets secured to the mounting pan 21, such as the brackets 28a, 29a and 30a of FIG. 1.

Each of the circuit breakers 28, 29, and 30 is provided with a shroud portion, such as a shroud portion 30b (FIG. 3) of the circuit breaker 30, which is provided with a plurality of recesses respectively receiving edge portions of the three bus bars 42 and the two intermediate insulators 46.

Figure 7:
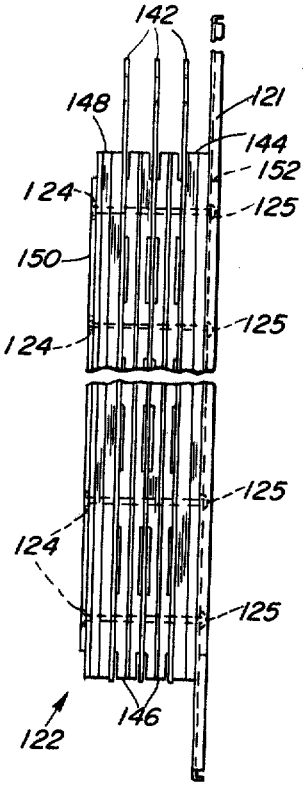
FIG. 7 is a side view of the mounting pan and bus bar assembly of the electrical panelboard of FIGS. 4, 5, and 6.
Figure 5:
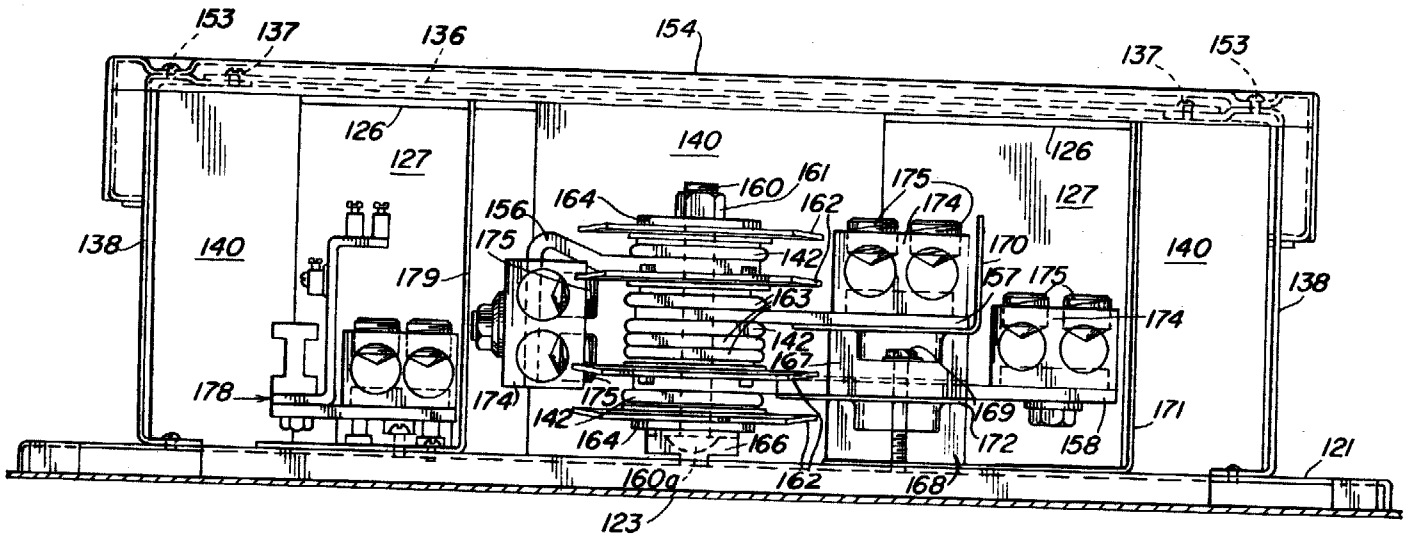
FIG. 5 is a top view of the mounting pan assembly and interior trim panel of FIG. 4.

FIGS. 4 through 7 illustrate an electrical panelboard 120 constructed in accordance with the invention, an exterior trim panel being omitted and only a rear wall portion of a box 123 being shown in FIG. 5. The panelboard 120 includes a mounting pan 121 having a stack 122 of elongated bus bars, insulators, and clamping members secured thereto by a plurality of nuts 124 threaded respectively on a plurality of bolts 125 extending through the stack 122 from the rear of the mounting pan 121 as best shown in FIG. 7. The stack 122 includes three elongated flat bus bars 142, a rear insulator 144, two intermediate insulators 146, a front insulator 148, a front insulating sheet 149 (FIG. 4), a front clamping member 150, and a rear clamping member 152 all substantially identical to but narrower than the corresponding parts of the stack 22 of FIGS. 1 through 3.

Figure 6:
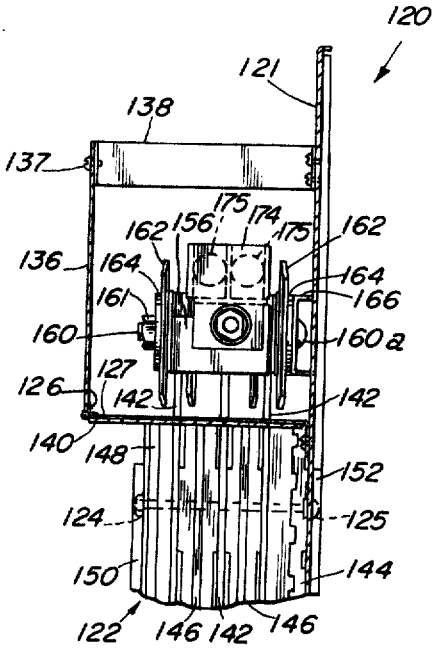
FIG. 6 is a fragmentary sectional view taken generally along the line 6—6 of FIG. 4, the interior trim panel being omitted.

The bus bars 142 are longer than the insulators 144, 146, and 148 and project beyond them as shown at the upper portion of FIG. 7, the projecting portions of the bus bars 142 extending through suitable openings in an insulating sheet 140 (FIG. 6) and into a compartment housing the connectors for connecting power to the bus bars 142, the compartment being defined by the mounting pan 121, the insulating sheet 140, and a safety panel 136 pivotally mounted adjacent its lower edge as viewed in FIG. 6 by a pair of hinges 126 mounted respectively on a pair of sheet metal brackets 127 secured to the mounting pan 121. The safety panel 136 is normally secured adjacent its upper end by a pair of screws 137 to a pair of spaced brackets 138 secured to the mounting pan 121.

Also secured to the brackets 138 by a pair of screws 153 is an interior trim panel 154 (FIGS. 4 and 5) including an upper portion 154a which normally covers the safety panel 136, a central panel portion 154b, and a pair of spaced side panel portions 154*c* and 154*d*. The spaces between the central panel portion 154b and the side panel portions 154c and 154d afford access to the handles of circuit breakers (not shown) mountable on the mounting pan 121 in electrical engagement with the bus bars 142 in the same manner the circuit breakers 28, 29, and 30 are mounted on the panelboard 20 of FIG. 1. A lower portion (not shown) of the interior trim panel 154 is secured to an end barrier similar to the end barrier 34 of FIG. 1.

Three terminal straps 156, 157, and 158 (FIG. 5) are electrically connected respectively to the bus bars 142 by means of a single-bolt joint including a bolt 160 and nut 161. The bolt 160 is provided with an insulating sleeve (not shown). The end portions of the bus bars 142 are interleaved between four insulators 162 centered on the bolt 160. Three spacers 163 are provided and are centered on the bolt 160 in the positions shown, one spacer 163 engaging the terminal strap 157 and two spacers 163 together engaging the center bus bar 142. Two spring washers 164 are provided on the bolt 160 respectively adjacent the nut 161 and a head 160a of the bolt 160. Also provided on the bolt 160 between the head 160a and the adjacent spring washer 164 is a generally U-shaped bracket 166 the leg portions of which have tongue portions protruding into appropriate slots in the mounting pan 121 and the bight portion of which has a square hole for receiving a square portion (not shown) of the bolt 160. The bracket 166 thus prevents the bolt 160 from turning.

The terminal straps 157 and 158 are supported respectively by a pair of stacked insulating base members 167 and 168 secured to the mounting pan 121 by a pair of screws 169. An L-shaped insulating sheet 170 is provided, one leg portion thereof being secured between the terminal strap 157 and the base member 167. An L-shaped insulating sheet 171 is provided, one leg portion thereof being secured between the base member 168 and the mounting pan 121. An insulating sheet 172 is disposed between the two base members 167 and 168 and bent partially around the terminal strap 158.

Each of the terminal straps 156, 157, and 158 has a connector body 174 secured thereto, each connector body 174 being provided with a pair of holes for respectively receiving a pair of electrical power conductors (not shown) and a pair of clamping screws 175 for respectively clamping the conductors.

A neutral wire connector assembly 178 is secured to the mounting pan 121 and shielded by an L-shaped insulating sheet 179.

FIGS. 8 and 9 illustrate an electrical panelboard 220 constructed in accordance with the invention, an exterior trim panel being omitted and a portion of an interior trim panel 254 being shown only in FIG. 9. The panelboard 220 includes a mounting pan 221 secured to a rear wall portion of a box 223. A stack 222 of elongated flat bus bars, insulators, and clamping members is secured to the mounting pan 221, the stack 222 being identical to the stack 122 of the panelboard 120 of FIGS. 4 through 7.

A pair of spaced brackets 238 secured to an upper portion of the mounting pan 221 serve as anchoring means for the interior trim panel 254, the lower portion of the interior trim panel 254 being secured to an end barrier (not shown) similar to the end barrier 34 of FIG. 1. Three flat bus bars 242 of the stack 222 extend through suitable openings in an insulating sheet 240 and into a single-bolt joint which includes a bolt 260 and a nut 261 and is similar to the single-bolt joint of FIG. 5 having the bolt 160. However, the three terminal straps 156, 157, and 158 of the panelboard 120 in FIG. 5 have been replaced in the panelboard 220 respectively by three offset conducting straps or main breaker connectors 256, 257 and 258 which are maintained in electrical engagement respectively with the bus bars 242 by the bolt 260 and nut 261.

Also associated with the bolt 260 are four insulators 262, three spacers 263, and a pair of spring washers 264 identical respectively with the insulators 162, spacers 163, and spring washers 164 of the panelboard 120 of FIGS. 4 through 7. An insulating sleeve 265 is provided on the bolt 260. The bolt 260 is kept from rotating by a bracket 266 in which a head 260a of the bolt 260 is received, tongue portions of the bracket 266 being received in appropriate slots in the mounting pan 221. A neutral wire connector assembly 278 (FIG. 8) shielded by an insulating sheet 279 is secured to the mounting pan 221. Electric power is fed to the bus bars 242 through a main circuit breaker 280 mounted on the mounting pan 221 and having sets of jaws 281 plugged respectively on the main breaker connectors 256, 257, and 258.

The arrangement of the bus bars in a stack and the plugging of circuit breakers directly on the edge portions of main bus bars rather than on separate branch bus bars results in a panelboard in which ranch circuit breakers of different ratings may be mounted readily in various combinations and arrangements. Thus, for example, with a panelboard of this invention, a 100-ampere circuit breaker may be readily mounted opposite a 200-ampere or a 400-ampere circuit breaker, and additional circuit breakers may be readily mounted in a previously installed panelboard without bolting additional branch bus bars to the main bus bars. Further, additional circuit breakers may be mounted in an energized panelboard with adequate safety if reasonable care is used.

The arrangement of the bus bars and insulators on the panelboard and their cooperation with the shrouds on the circuit breakers result in a short circuit interrupting rating, for each circuit breaker mounted on the panelboard, as high as the maximum short circuit interrupting rating the circuit breaker would have if mounted by itself in a separate enclosure, and also result in elimination of flashover problems on short circuit.

The short current paths from the bus bars to the circuit breakers results in less heat generation, and the solid connection between bus bars, insulators, and mounting pan for the full length of the bus bars results in good heat conduction away from the bus bars. Further, the bus bars are braced against short circuit forces throughout their length.

The bus bar arrangement also results in the use of less bus bar material and in the ability to use a shallower box for the panelboard than in the case of former panelboards of equivalent ratings.

The single-bolt joint at the power input end of the bus bars saves space and hardware and provides an easy means of obtaining necessary electrical clearances. Further, various components of the joint structure may be the same, regardless of whether the bus bars are fed through a main breaker, the bolt, nut, spring washers, insulating sleeve, spacers, bolt-retaining bracket, and joint insulators being usable either in the joint structure of FIG. 5 or in the joint structure of FIG. 9. The single-bolt joint construction also permits the main bus bars to be flat, rather than offset at the joint, thus enabling them to be manufactured to closer tolerances and reducing required box depth.

The hinged safety panel, such as the safety panels 36 and 136, and the shielding of the bus bars from the front by the front insulator, such as the front insulators 48 and 148, prevent contact between the interior trim panel, such as the interior trim panel 154, and any energized parts of the panelboard when a workman is installing the interior trim panel on an energized panelboard. The hinges such as hinges 126 provide a convenient means for swinging the safety panel away from thr power connections to the bus bars and the brackets such as brackets 38, 138, and 238 stop movement of the safety panel in a closing direction to prevent it from contacting the power connections.

We claim:

1. An electrical panelboard comprising a generally flat mounting pan, a plurality of elongated flat bus bars mounted on said mounting pan with their flat sides parallel to said mounting pan, said bus bars being spaced from and aligned with each other in a direction perpendicular to said mounting pan, and a plurality of elongated insulators one more in number than the number of said bus bars, said insulators being spaced from and aligned with each other in a direction perpendicular to said mounting pan and being substantially coextensive longitudinally with said bus bars, said bus bars being interleaved between said insulators, each of said bus bars having a pair of exposed opposite longitudinal edge portions, and said bus bars and insulators being in contact with each other in such a manner that each of said bus bars is in direct contact on opposite sides respectively with a pair of adjacent ones of said insulators.

2. An electrical panelboard as claimed in claim 1, wherein one of said insulators between said mounting pan and an adjacent one of said bus bars has a plurality of portions in contact with said mounting pan and dispersed substantially throughout the length of said one insulator.

3. An electrical panelboard as claimed in claim 1, wherein an intermediate one of said insulators has a relatively thick central portion each of the opposite sides of which engages a resprctive one of said bus bars and a pair of relatively thin opposite edge portions spaced in a direction perpendicular to said bus bars from those bus bars which engage said relatively thick central portion.

4. An electrical panelboard as claimed in claim 3, wherein said intermediate insulator has an overall width substantially the same as the width of one of said bus bars.

5. An electrical panelboard comprising a generally flat mounting pan, a plurality of elongated flat bus bars mounted on said mounting pan with their flat sides parallel to said mounting pan, means maintaining said bus bars in spaced relation to, and aligned with, each other in a direction perpendicular to said mounting pan, and a single-bolt joint structure through which electrical power may be connected to said bus bars, said single-bolt joint structure including a single bolt and a plurality of conductive straps, said conductive straps having portions interleaved with end portions of said bus bars, and said single bolt extending through said bus bars and conductive straps and maintaining said conductive straps in electrical engagement respectively with said bus bars.

6. An electrical panelboard as claimed in claim 5, wherein said conductive straps are terminal straps each having an electrical connector secured thereto for receiving a power conductor.

7. An electrical panelboard as claimed in claim 5, wherein said bus bars are of the same thickness and said conductive straps are main breaker connectors each having opposite end portions offset by a distance corresponding to the thickness of one of said bus bars.

8. An electrical panelboard as claimed in claim 7, wherein there are three of said main breaker connectors, and including a three-pole main breaker each pole of which is electrically and mechanically connected to a separate one of said three main breaker connectors.

9. An electrical panelboard as claimed in claim 8, wherein each pole of said three-pole main breaker includes a pair of plug-on jaws plugged on the respective main breaker connector.

10. In an electrical panelboard having an open-front box, a mounting pan secured to a rear wall portion of said box, a plurality of elongated bus bars mounted on said mounting pan, a plurality of power connectors at one end of said mounting pan, means electrically connecting said power connectors respectively to said bus bars, said connectors respectively providing means to receive a plurality of power conductors for supplying electric power respectively to said bus bars, and a trim panel mounted in covering relationship to said mounting pan, bus bars, and power connectors, the improvement comprising a hinged safety panel normally covering only said power connectors and preventing contact of said trim panel therewith.

*11. An electrical panelboard comprising a generally flat mounting pan, a plurality of elongated flat bus bars, and a plurality of elongated insulators, said bus bars having their flat sides parallel to said mounting pan and being spaced from and aligned with each other in a direction perpendicular to said mounting pan, each pair of adjacent bus bars having one of said insulators disposed therebetween, said insulators being aligned with each other and with said bus bars in a direction perpendicular to said mounting pan and being substantially coextensive with said bus bars longitudinally thereof, each of said bus bars having an exposed longitudinal edge portion, and said bus bars and insulators being secured to each other and to said mounting pan.*

*12. An electrical panelboard as claimed in claim 11 including an elongated insulator substantially coextensive with said bus bars longitudinally thereof, aligned with*

*said bus bars and with said insulators therebetween in a direction perpendicular to said mounting pan and secured to said mounting pan therewith, and disposed on the opposite side of said bus bars from said mounting pan.*

*13. An electrical panelboard as claimed in claim 11 including an elongated insulator substantially coextensive with said bus bars longitudinally thereof, aligned with said bus bars and with said insulators therebetween in a direction perpendicular to said mounting pan and secured to said mounting pan therewith, and disposed between said mounting pan and an adjacent one of said bus bars.*

*14. An electrical panelboard as claimed in claim 13 including an elongated insulator substantially coextensive with said bus bars longitudinally thereof, aligned with said bus bars and with said insulators therebetween in a direction perpendicular to said mounting pan and secured to said mounting pan therewith, and disposed on the opposite side of said bus bars from said mounting pan.*

*15. An electrical panelboard as claimed in claim 14 including a clamping member clamping said insulators and bus bars to said mounting pan, said clamping member being substantially coextensive with said insulators and bus bars longitudinally thereof.*

*16. An electrical panelboard as claimed in claim 15 including a second clamping member on the opposite side of said mounting pan from said insulators and bus bars, said second clamping member being substantially coextensive with said insulators and bus bars longitudinally thereof, and said mounting pan, insulators, and bus bars being clamped between said clamping members.*

*17. An electrical panelboard as claimed in claim 11, wherein each of said insulators disposed between a pair of adjacent bus bars has a relatively thick central portion opposite sides of which respectively engage said adjacent bus bars and a pair of relatively thin opposite edge portions each spaced from both of said adjacent bus bars in a direction perpendicular thereto.*

*18. An electrical panelboard as claimed in claim 17, wherein each of said insulators disposed between a pair of adjacent bus bars has an overall width substantially the same as the width of one of said bus bars.*

References Cited

The following references, cited by the Examiner, are of record in the patented file of this patent or the original patent.

UNITED STATES PATENTS

| | | | |
|---|---|---|---|
| 2,632,039 | 3/1953 | Hammerly et al. | 317—119 |
| 2,837,699 | 6/1958 | Fore | 317—119 |
| 1,725,441 | 8/1929 | Caldwell | 317—112 X |
| 2,120,103 | 6/1938 | Linde | 339—125 X |
| 2,955,147 | 10/1960 | Carlson | 317—120 X |
| 3,171,888 | 3/1965 | Stanback. | |
| 3,202,881 | 8/1965 | Carlyle | 317—120 X |

LEWIS H. MYERS, Primary Examiner

GERALD P. TOLIN, Assistant Examiner

U.S. Cl. X.R.

174—99